United States Patent [19]
Feldsine

[11] Patent Number: 5,605,420
[45] Date of Patent: Feb. 25, 1997

[54] HIGH SPEED ROTATING TOOL HAVING A BAND OF HIGH TENACITY MATERIAL ABOUT THE PERIMETER

[75] Inventor: Timothy R. Feldsine, Clayton, N.C.

[73] Assignee: Kennametal Inc., Latrobe, Pa.

[21] Appl. No.: 577,164

[22] Filed: Dec. 22, 1995

[51] Int. Cl.[6] .............................. B23C 5/10; B23C 5/16; B23C 5/00
[52] U.S. Cl. ............................... 407/32; 407/34
[58] Field of Search ................ 407/32–35, 118, 407/119

[56] References Cited

U.S. PATENT DOCUMENTS

| | | | |
|---|---|---|---|
| 2,431,581 | 11/1947 | Owen et al. | 407/118 |
| 2,879,069 | 3/1959 | Swanson | 279/103 |
| 3,907,729 | 9/1975 | Burkey et al. | 260/17.2 |
| 4,072,084 | 2/1978 | Knight, Jr. et al. | 90/11 A |
| 4,522,538 | 6/1985 | Lindsay | 407/35 |
| 5,018,915 | 5/1991 | Inokuma et al. | 409/231 |
| 5,135,337 | 8/1992 | Adamson | 407/119 |
| 5,152,640 | 10/1992 | Regis et al. | 407/32 |
| 5,232,316 | 8/1993 | Tennutti | 407/118 |

*Primary Examiner*—M. Rachuba
*Assistant Examiner*—Kenneth J. Hansen
*Attorney, Agent, or Firm*—James G. Porcelli

[57] ABSTRACT

A rotating tool mateable with the spindle of a machine tool for high speed rotation is disclosed. The tool is comprised of a shank and a disk. The disk has attached to its periphery cutting inserts. These inserts may be attached directly to recesses in the disk or to lugs protruding from the disk. If the inserts are attached to lugs, then the disk will further have opposing counterweight lugs protruding from the disk in an opposite direction. A band of high tenacity material extends around the disk to restrain radial expansion. Additionally, the disk may be encompassed in a restraining material to restrain any disk parts that may separate from the disk body.

28 Claims, 6 Drawing Sheets

HIGH SPEED ROTATING TOOL HAVING A BAND OF HIGH TENACITY MATERIAL ABOUT THE PERIMETER

BACKGROUND OF THE INVENTION

This invention relates to a high speed rotating tool and more particularly to a milling cutter using a rotating disk. A band has been included about the disk to restrain expansion caused by centrifugal forces.

Milling cutters are currently designed with a solid body connected to a shank which is attached to a machine tool. Such a design is attractive for most applications with rotational speeds less than 10,000 rpm. In an effort to increase efficiency while at the same time maintaining quality finishes, it is desired to rotate milling cutters at speeds above 10,000 revolutions per minute (rpm). Currently, there is a need to provide a milling cutter which will effectively operate at a speed of at least 30,000 rpm.

Commercially available milling cutters are not capable of such rotation. The cutters are made of steel which has a large specific gravity. The resultant weight of a milling cutter made of steel causes deformation from centrifugal force at high speed operation. This results in misalignment of the cutter inserts and non-uniformity of the dimensions of the machine products.

Furthermore, vibration will still exist during a cutting operation and the ability of vibration attenuation of steel is small. Therefore, this vibration may not be effectively dampened.

Also, a milling cutter of steel has excessive inertia which encumbers a machine tool and requires a longer time for accelerating to or decelerating from a high speed. Acceleration also requires a machine tool having greater power.

U.S. Pat. No. 5,018,915 entitled, "Spindles of Machine Tools" teaches a machine tool spindle comprised of wound carbon or glass fiber impregnated with a heat curable resin for use with the spindle adapted to accommodate the shank of a tool.

Additionally, the article entitled "Energy Storage: Search for the Perfect Flywheel" from Popular Science Magazine, Vol. XX (DATE) teaches the design of high speed flywheels using various composite materials.

Neither of these references teach or suggest a milling cutter design. There exists a need for a milling cutter for use for speeds of at least 30,000 rpm. Additionally, the possibility of tool failure becomes even more important at such high speeds and therefore some mechanism is required to limit the radial expansion of the milling cutter and in the event of failure to physically restrain parts loosened ejected from the milling cutter.

It is an object of this invention to provide a milling cutter of reduced weight to minimize centrifugal forces caused by rotation of the cutter.

Another object of this invention is to provide a milling cutter in which radial expansion is restrained.

Another object of this invention is to provide a means for dampening vibration of the milling cutter body.

Still another object of this invention is to provide a restraining means so in the event of a milling cutter failure any parts that may become loose would be physically restrained from separation away from the milling cutter body.

SUMMARY OF THE INVENTION

According to this invention, there is provided a rotating tool mateable with the spindle of a machine tool for high speed rotation about a longitudinal axis. The tool is made up of a shank mountable within the spindle and a disk connected to the shank and having a central hub and an outer periphery. The disk is symmetric about the longitudinal axis. To the periphery of the disk in a symmetric pattern are attached cutting inserts. About the periphery of the disk is a band of high tenacity material to restrain expansion from centrifugal forces on the disk. The disk may be encompassed by a sheath to dampen vibration and to restrain the disk parts in the event they become separated from the body. There may be passageways through the disk and hub ports through the central hub for weight reduction. The sheath material may also penetrate these passageways and hub ports to become interconnected about the disk.

DESCRIPTION OF THE PREFERRED EMBODIMENT

Figure 1:
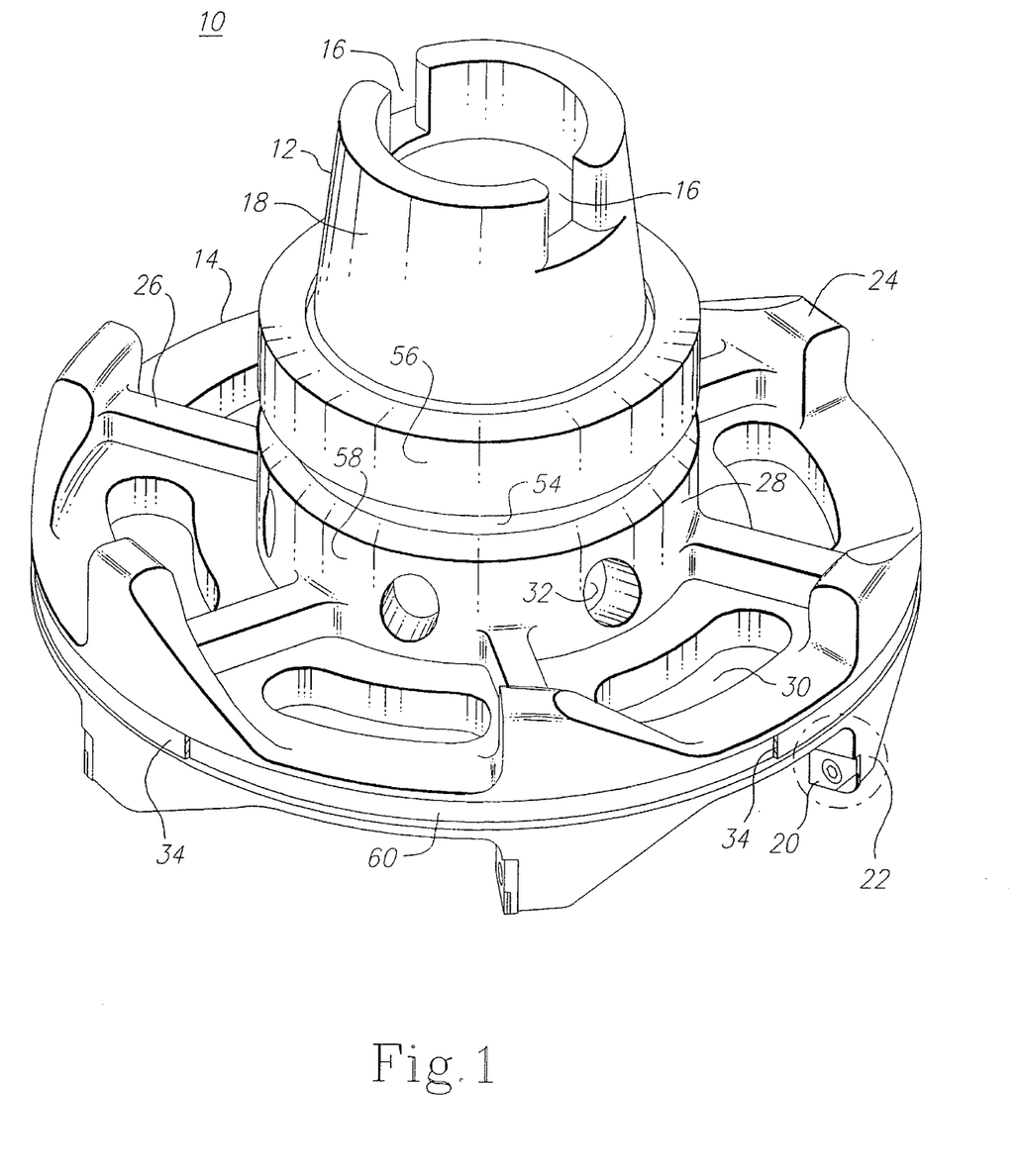
FIG. 1 is an isometric drawing of the cutter in the subject invention.

FIG. 1 shows a milling cutter 10 in accordance with the present invention having a shank 12 connected to a disk 14. The shank 12 is of a standard design such as, for example, the HSK standardized interface design utilizing two locating slots 16 to be engaged by matching keys (now shown) and a frustoconical outer circumference 18 to be engaged by a mating spindle of a machine tool (not shown).

Cutting inserts 20 are symmetrically attached to the periphery of the disk 14. The cutting inserts 20 may be connected to the disk 14 through insert lugs 22. On the other hand, the cutting inserts 20 may be mounted within recesses in the disk 14 such that only the cutting portion of each insert 20 protrudes from the disk 14.

The introduction to the disk 14 of the cutting inserts 20 and the insert lugs 22 protruding from the disk 14 creates an offset mass which disrupts the otherwise symmetrical nature of the disk 14. While such a configuration may be dynamically balanced, centrifugal force will cause the insert lugs 22 and cutting inserts 20 to deflect radially outwardly thereby imposing a bending moment about a line tangent to the disk 14 at the insert lug 22 location. This would have the effect of cupping the disk 14 by bending the disk up at each lug 22 location. While this could effect the structural integrity of the milling cutter 10, it could also have an effect on the location of each cutting insert 20 relative to a workpiece. Such bending, which would be exaggerated at higher speeds, is undesirable.

For that reason, counterweight lugs 24 extend from the disk 14 at the same radial locations on the disk 14 as the insert lugs 22, but on opposite sides of the disk 14. Each counterweight lug 24 has a center of gravity that is longitudinally aligned with the center of gravity of the insert lug 22/cutting insert 20 combination and is also located an equal distance along the longitudinal axis from the disk center so that the counterweight lug 24 provides a force equal and opposite to that of the force generated by the insert lug 22/cutting insert 20 combinations. In such a fashion, the deformation of the disk 14 from bending caused by the introduction of the insert lugs 22 and cutting inserts 20 will be eliminated.

To restrain the radial deflection caused by radial expansion from rotation, each counterweight lug 24 and insert lug 22 may be connected with spokes 26 from the central hub 28. The height of such spokes may be approximately one-half the height of a respective lug.

To minimize the mass of the milling cutter 10, nonessential material has been removed from the disk 14. Specifically, the disk material between the pairs of lugs has been removed to define passageways 30 through the disk 14. Additionally, material has been removed from the central hub 28 to define radial through-holes or hub ports 32. Not only does the removal of this material reduce the weight associated with the milling cutter, but furthermore this removal eliminates mass which would otherwise contribute to the centrifugal forces experienced by the cutter.

It is possible to fabricate the disk of a material other than steel and under these circumstances the need to remove material for weight reduction is diminished.

Even with the removal of material from the disk 14 and the central hub 28, there exists the possibility that the remaining radial support members, that is the spokes 26 and the disk material remaining between the passageways 30, could radially expand as a result of high speed rotation of the cutter 10. To contain such expansion, a band 34 of high tenacity material is secured about the perimeter of the disk 14.

A high tenacity material will have a high tensile strength and also a high modulus of elasticity to provide stiffness. The band may be made of, among other materials, carbon graphite fibers bonded with a resin or of a high tensile metal such as certain steels. In such a manner, the advantages of removing material from the milling cutter may be realized while, at the same time, the disadvantages of less structural support will be negated by the existence of the band 34.

Figure 2:
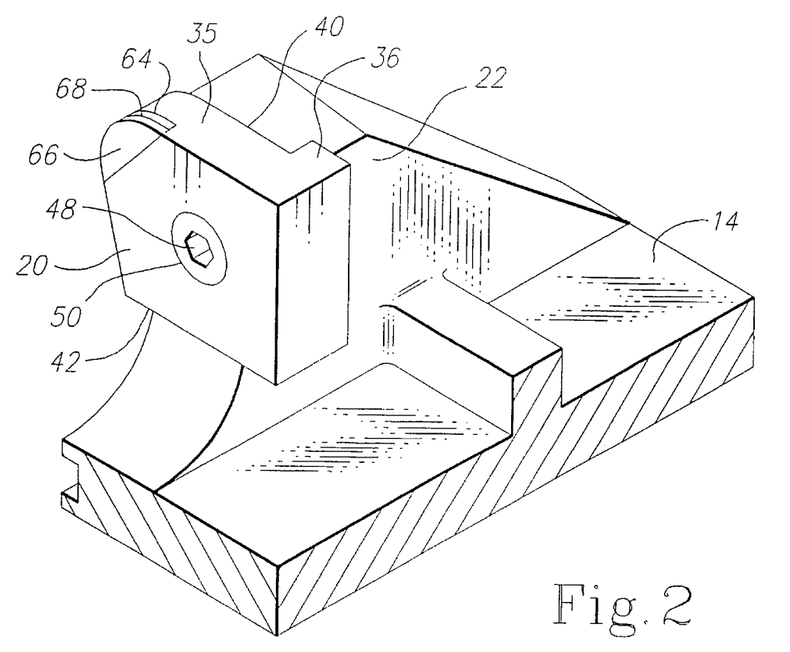
FIG. 2 is a detailed isometric drawing of the encircled portion of FIG. 1, inverted for clarity.
Figure 3:
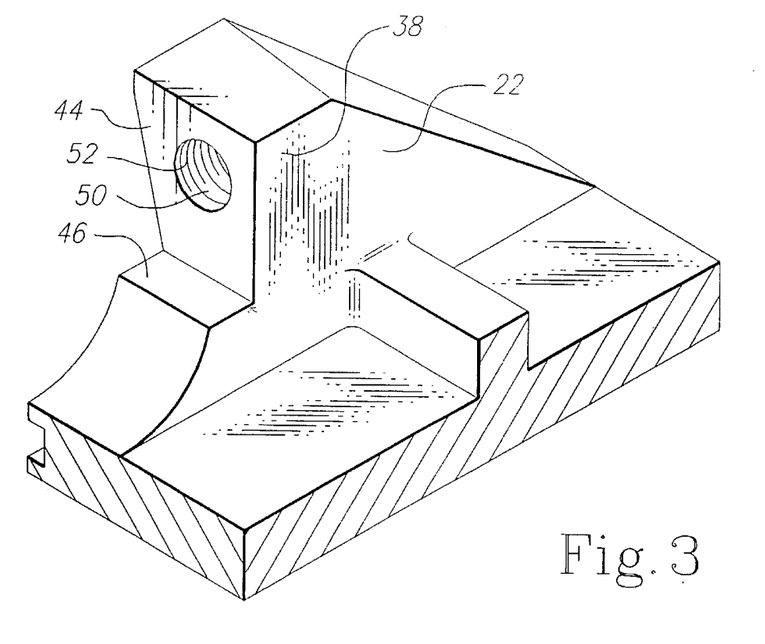
FIG. 3 is a detailed isometric identical to FIG. 2 but with the cutting insert removed.

FIGS. 2 and 3 show additional details of the cutting insert 20 and insert lug 22 encircled in FIG. 1. Note for clarity, FIGS. 2 and 3 have been inverted from that orientation shown in FIG. 1. Directing attention to FIG. 2, protruding from the disk 14 is the insert lug 22 with an insert 20 attached. The insert 20 is comprised of an L-shaped substrate 35 having a lip 36 which engages a mating side face 38 (FIG. 3) on the lug 22. Additionally, the insert has a back surface 40 and a bottom surface 42 for mating with the mating front face 44 and the mating bottom face 46, respectfully, of the lug 22. The insert 20 may be secured against the lug 22 using a screw 48 which extends through a central opening 50 in the insert and engages a threaded bore 52 behind the mating front face 44 of the lug 22.

The insert 20 could be secured to the insert lug 22 in other conventional ways also, such as by brazing the insert 20 to the insert lug 22.

It should be noted that in FIGS. 1–3, the transition between surfaces in many instances is curved or radiused. It is well known that in any design, sharp corners produce stress concentrations which may introduced weak points in a structure. For that reason, the stresses in these areas may be reduced by providing a smooth transition between surfaces. Although it is not shown in each instance, it should be understood that a preferred design entails using smooth transitions to blend each discontinuous surface.

Focusing again on FIG. 1, there is a circumferential slot 54 extending about the circumference of the central hub 28 with a first flange 56 above the slot and a second flange 58 below the slot 54. While the purpose of the first flange 56 may be to properly position the shank 12 within the spindle of a machine tool, the thickness of this flange 56 and the existence of the slot 54 is determined entirely by the requirements for mechanical fingers which will engage the slot 54 during an automatic tool change operation.

Therefore, it should be appreciated that the circumferential slot 54, the first flange 56 and the remaining shank 12 may all be easily modified to conform to any of a large number of commercially available tool changing arrangements, which may or may not be automatic.

The shank 12 and flanges 56 and 58 typically are made of steel or steel alloys. However, while the disk may be made of identical materials thereby causing the shank and disk to be one integral piece, it is entirely possible for the shank 12 to be made of conventional material and the disk be made of another material possessing desirable properties such as high planar stiffness.

Specifically, while the shank will usually be made of steel, the disk 14 may be made of metal, such as steel or titanium, or of materials having a low density and a high stiffness such as fiber reinforced composite materials. Many such materials are now being used in industrial fields. It would be possible to mate the shank 12 of one material and the disk 14 of a second material using conventional means such as two mating flanges connected by bolts. Because the radial distance of the central hub 28 is small relative to the radial distance to the perimeter of the disk 14, the centrifugal force on these mating components would be lower.

As shown in FIG. 1, the band 34 could mate with the disk 14 in a groove 60 about the circumference of the disk 14. In the alternative, the groove 60 could be eliminated and the band 34 could be secured to the outer circumference of the disk 14.

The cutting inserts 20 may have a substrate 35 with a recess 64 into which a polycrystalline diamond (PCD) tip 66 may be brazed. Under these circumstances, it is preferable to include a backing plate 68 between the PCD tip 66 and the substrate 62 to provide sufficient support for the brittle PCD tip 66. It is also possible to secure the PCD tip 66 directly to the lug, however under such conditions the tip 66 would not be easily replaced. Finally, it is possible to use a cutting tip made of another material other than PCD, such as, for example, a carbide or coated carbide material.

What has been described is a milling cutter capable of high speeds made possible by structural modifications for strength and the removal of material to reduce mass and forces associated with such mass. While this design is functional, there is, just as with any rotating tool, always a possibility of a catastrophic failure during operation.

Figure 4:
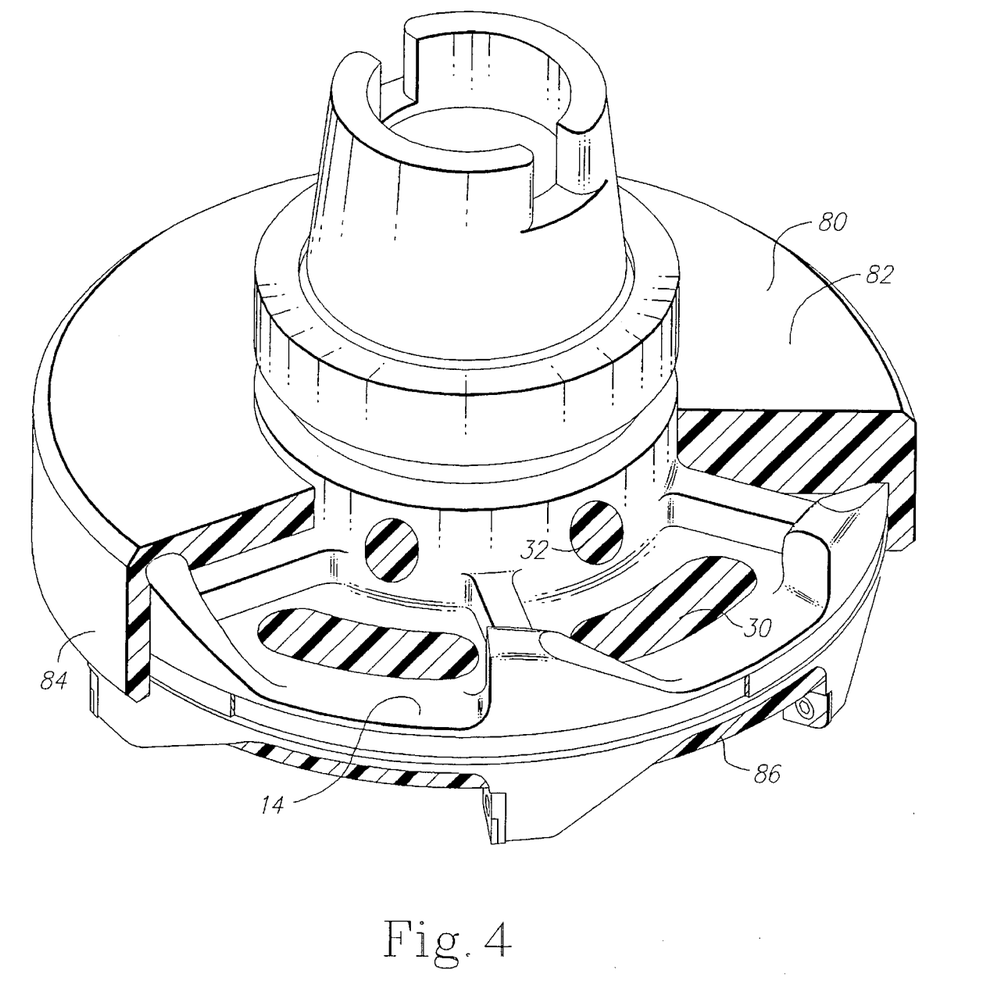
FIG. 4 shows an isometric of a second embodiment of the subject invention in which restraining material has been added.

FIG. 4 shows a second embodiment of the invention in which the disk 14 shown in FIGS. 1 through 3 is encompassed in a sheath 80. The sheath is intended to function as a restraining material in the event of a catastrophic failure. As seen in FIG. 4, the top 82 of the sheath and side 84 of the sheath completely cover the top and side of the disk 14. Additionally, as seen in FIGS. 4 and 5, the bottom 86 of the sheath covers a substantial portion of the bottom of the milling cutter.

Figure 5:
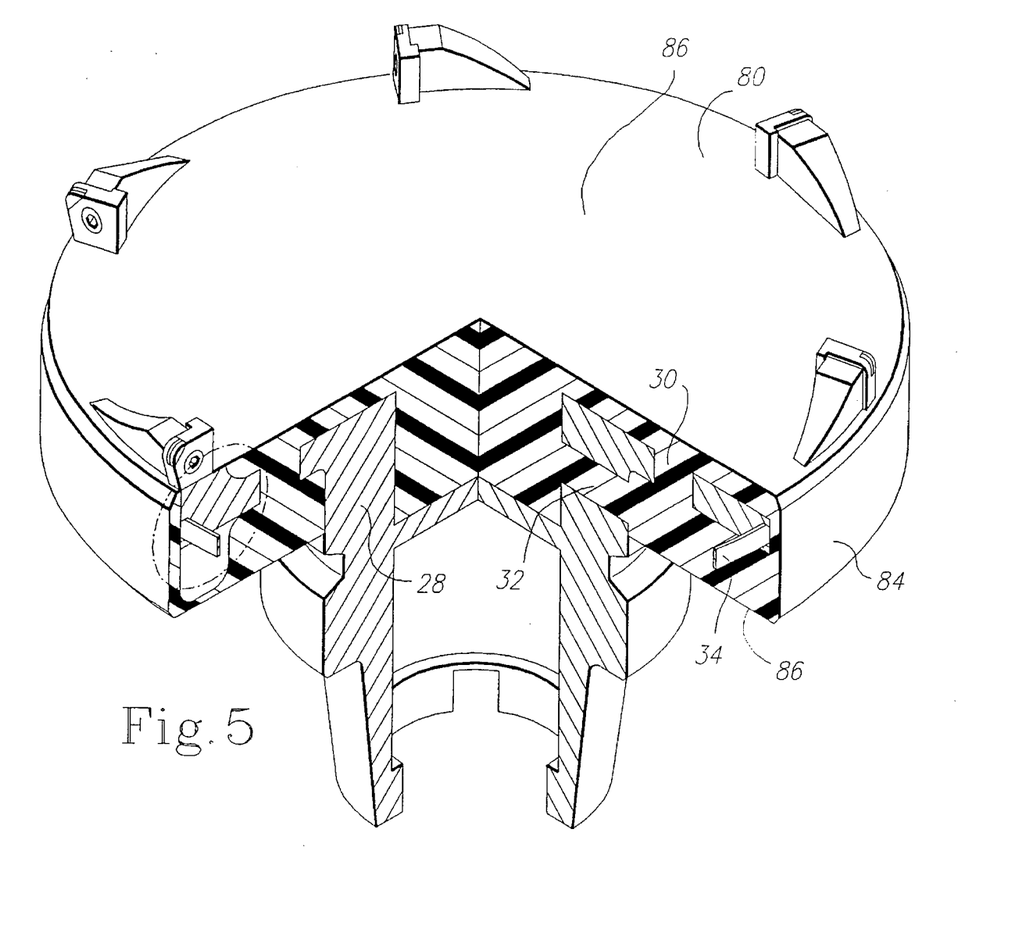
FIG. 5 shows a cutaway isometric view of the subject invention inverted from that shown in FIG. 4.

Also as seen from FIGS. 4 and 5, the sheath material penetrates the passageways 30 and hub ports 32 in the disk 14 and in the central hub 28. As a result, the sheath material is interconnected through the disk of the milling cutter thereby providing the maximum ability to restrain any parts of the disk 14 that may become loose. Also, as seen from FIGS. 5 and 6, the band 34 is also encompassed by the sheath material.

Figure 6:
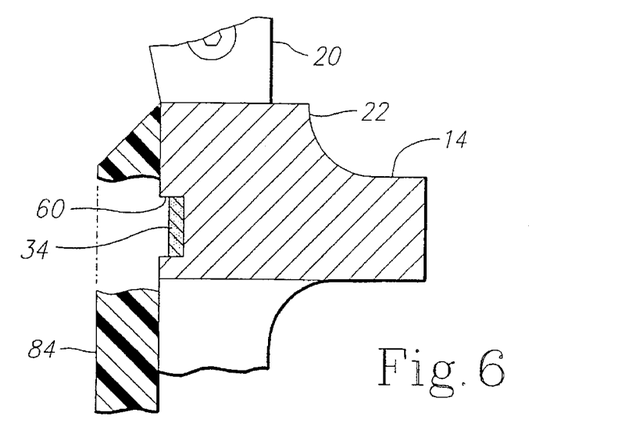
FIG. 6 shows the detail encircled in FIG. 5.

It should be appreciated from FIGS. 4 and 6 that the sheath material fully encompasses the disk 14 and encompasses the insert lugs 22 as much as possible without effecting the ability to easily replace cutting inserts 20. This feature becomes less important when the inserts are permanently attached to the insert lug 22.

Because the milling cutter is intended to be operated at high speeds, balancing becomes very important. Although it may be possible to accurately dynamically balance the shank 12 and the associated disk 14 of the milling cutter along with the cutting inserts 20, there is less control over a homogeneous and balanced distribution of the sheath material. Therefore, it is likely that the milling cutter will require supplemental balancing which may be accomplished through the introduction of any one of a number of commercial balancing techniques available. This could include the use of balancing rings described in U.S. Pat. No. 5,074,723, entitled "Method and Apparatus for Balancing a Rotary Tool Assembly" and assigned to Kennametal Inc.

The sheath material may be any type of resilient material that is capable of encompassing and restraining parts of the disk 14 that may become detached. Specifically, the sheath may be comprised of any number of materials including carbon fiber reinforced polymer (CFRP), aromatic polyimide fiber, or a carbon-glass fiber reinforced polymer. These materials would be molded or wound around the disk 14 such that the material would penetrate the passageways 30 and hub ports 32 and also spread across the top 82 and bottom 86 of the sheath 80.

The resulting configuration would be an interconnected mass of sheath material that would be capable of containing loose parts of the disk 14. It is not necessary for the sheath material to retain any such part in its original position. Therefore, in the event of separation, there could be a significant imbalance in the milling cutter and the sheath would merely contain the parts until the cutter could be stopped.

FIG. 6 shows a section detail of the band 34 within the groove 60 of the disk 14. Note that the band 34, just as the rest of the disk 14, is encompassed by the sheath 80.

Figure 7:
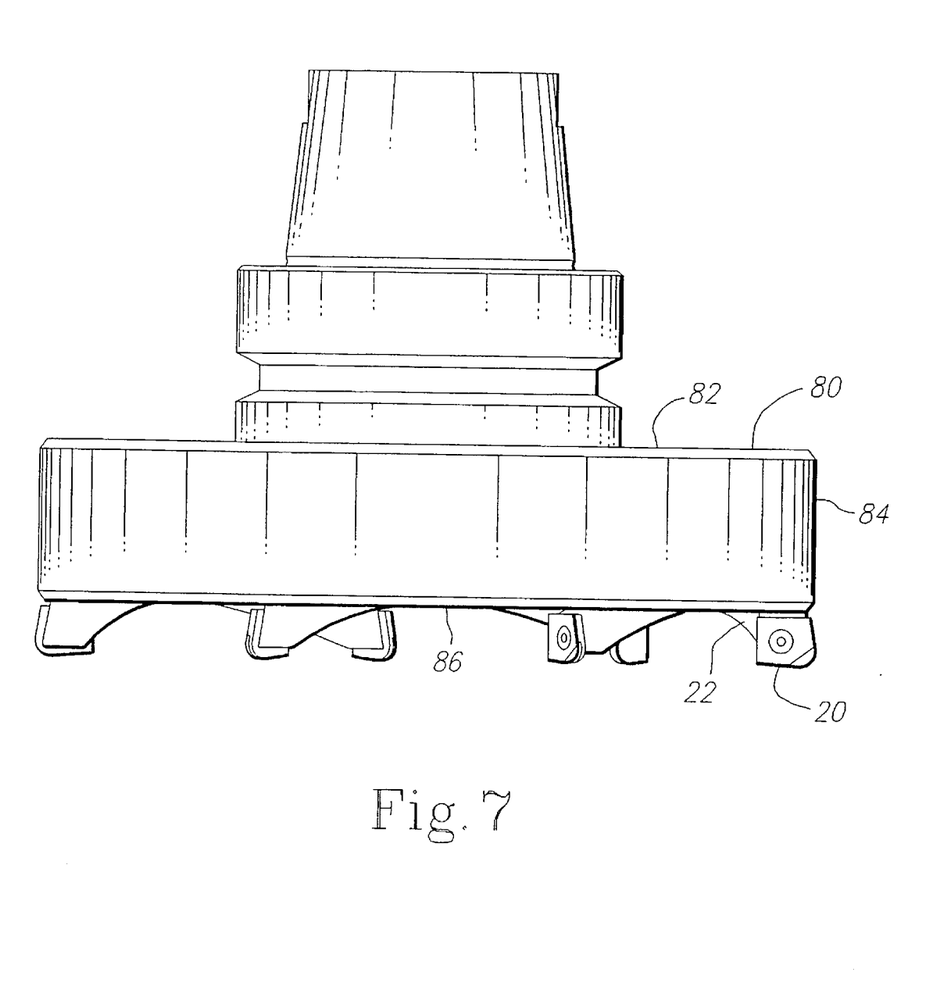
FIG. 7 shows a side view of the subject invention.

FIG. 7 shows a side view of the second embodiment of the invention in which the disk (not seen) is encompassed by the sheath 80. This illustrates not only the capacity of the sheath to encompass the disk, but also the ability of the sheath to provide a streamlined contour to what otherwise would be a fairly discontinuous configuration shown in FIG. 1. At high rotational speeds, irregularities of a rotating part tend to produce noise and imbalances produced by aerodynamic turbulence. For these reasons, the sheath provides the secondary benefit of streamlining the profile of the milling cutter thereby minimizing noise and vibration caused by surface irregularities.

Finally, regardless of the extent to which the milling cutter may be balanced, there will always be some level of vibration. Independent of the milling cutter design, such vibration may even be caused by lack of homogeneity in the workpiece. While such vibrations may not be completely controlled, the sheath material may act upon the shank 12 and disk 14 to effectively dampen such vibrations within the milling cutter. This is beneficial because, in some applications, without such vibration dampening, the unsheathed milling cutter shown in FIG. 1 may be subjected to vibrations that would result in undesirable displacement of the cutting inserts 20.

Therefore, the benefits of the sheath 80 are three-fold. First, the sheath encompasses and restrains the parts of the milling cutter, second the sheath minimizes noise and aerodynamic vibration, and third the sheath acts to reduce internal vibration within the milling cutter.

Figure 8:
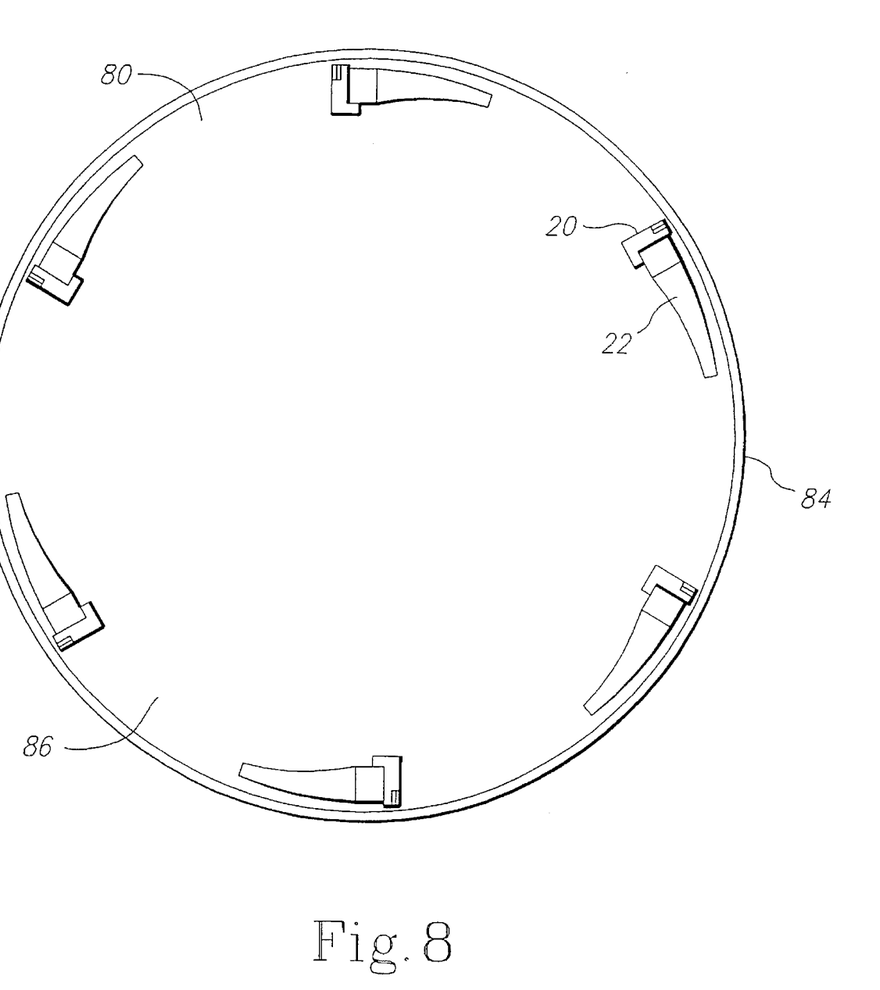
FIG. 8 shows a bottom view of the subject invention.

FIG. 8 shows a bottom view of the milling cutter and illustrates the smooth profile accomplished through the sheath material.

As described, the rotating tool should have high stiffness, stable cutting inserts, resistance to vibration, as well as encasement to contain parts that may be loosened as a result of cutter failure.

The type of the carbon fiber that may be used for any parts of the tool must possess high strength. Among these materials are aramide fibers including fibers having negative expansion coefficients. Such fibers may be combined with thermosetting resins, thermoplastic resins, epoxy resins, phenol resins, polyester resins, vinyl ester resins and polyimide resins.

The method of applying the fiber reinforced composite material includes direct filament winding, sheet winding and roving winding.

Although this invention has been described with respect to two preferred embodiments, various modifications, revisions, and additions will become evident to persons of ordinary skill in the art. While this discussion has been directed toward a milling cutter design, this design should not be limited to such cutters and any be applied to any other rotating tool utilizing a disk attached to a shank and having a diameter larger than the shank. All such revisions, modification, and additions are intended to be encompassed within the scope of this invention, which is limited only by the claims appended hereto.

What is claimed is:

1. A rotating tool mateable with the spindle of a machine tool for high speed rotation about a longitudinal axis comprised of:

a) a shank mountable within the spindle;

b) a disk symmetric about the longitudinal axis, connected to the shank and having a central hub and an outer periphery;

c) cutting inserts symmetrically attached to the periphery of the disk; and d) a separate band of high tenacity material about the perimeter of the disk to restrain expansion from centrifugal forces on the disk.

2. The tool according to claim 1 wherein the band is made of carbon fibers.

3. The tool according to claim 1 wherein the band is made of steel.

4. The tool according to claim 1 wherein the band is made of carbon graphite fibers.

5. The tool according to claim 1 wherein the band is made of metal.

6. The tool according to claim 1 wherein the inserts longitudinally protrude from the disk.

7. The tool according to claim 1 wherein the disk is further comprised of insert lugs longitudinally protruding from the outer periphery of the disk and the inserts are attached to these lugs.

8. The tool according to claim 7 wherein the disk is further comprised of counterweight lugs longitudinally protruding from the outer periphery of the disk in a direction opposite to that of the insert lugs.

9. The tool according to claim 1 wherein each insert is comprised of a substrate having a lip which engages a mating edge on the disk to radially restrain the insert.

10. The tool according to claim 9 wherein each insert is comprised of a substrate having a polycrystalline diamond tip.

11. The tool according to claim 9 wherein each insert is comprised of a substrate having a carbide material.

12. The tool according to claim 1 further including a sheath encompassing at least the periphery of the disk.

13. The tool according to claim 12 wherein the sheath further encompasses the top of the disk and a portion of the bottom of the disk leaving the inserts uncovered.

14. The tool according to claim 12 wherein the sheath is comprised of a carbon fiber reinforced polymer material.

15. The tool according to claim 12 wherein the sheath is comprised of a aromatic polyimide fiber material.

16. The tool according to claim 12 wherein the sheath is comprised of a carbon glass reinforced polymer material.

17. The tool according to claim 1 the disk has a series of spokes connecting the central hub with the outer periphery of the disk.

18. The tool according to claim 17 wherein the spokes are positioned to circumferentially align with the inserts.

19. The tool according to claim 17 further including a sheath encompassing the top, periphery and a portion of the bottom of the disk leaving the cutting inserts uncovered.

20. The tool according to claim 17 wherein the material between the spokes is removed to define a series of passageways through the disk.

21. The tool according to claim 20 further including a sheath encompassing the top, periphery and a portion of the bottom of the disk leaving the cutting inserts uncovered and wherein the sheath extends through and is interconnected by the passageways.

22. The tool according to claim 20 wherein the central hub of the disk has a series of hub ports radially oriented and positioned about the circumference of the hub.

23. The tool according to claim 22 wherein the sheath further extends through and is interconnected by the hub ports.

24. The tool according to claim 1 wherein the shank and the disk are integral and made of steel.

25. The tool according to claim 1 wherein the shank and the disk are integral and made of titanium.

26. The tool according to claim 1 wherein the shank is made of steel and the disk is made of titanium.

27. The tool according to claim 1 wherein the shank is made of steel and the disk is made of a fiber reinforced composite material.

28. A rotating tool mateable with the spindle of a machine tool for high speed rotation about a longitudinal axis comprised of:

a) a shank mountable within the spindle;

b) a disk symmetric about the longitudinal axis, connected to the shank and having a central hub and an outer periphery;

c) a series of insert lugs protruding longitudinally from the outer periphery of the disk and symmetrically disposed about the periphery of the disk;

d) cutting inserts attached to each insert lug;

e) a series of counterweight lugs longitudinally protruding from the outer periphery of the disk in a direction opposite to that of the insert lugs;

f) a separate band of high tenacity material about the perimeter of the disk to restrain expansion from centrifugal forces on the disk; and g) a sheath encompassing the top and sides of the disk and a portion of the bottom of the disk leaving the cutting inserts uncovered.

* * * * *